Sept. 5, 1967   A. ASHKIN   3,340,479
LASER TUNABLE BY JUNCTION COUPLING
Filed June 14, 1964

INVENTOR
A. ASHKIN
BY
ATTORNEY

United States Patent Office 3,340,479
Patented Sept. 5, 1967

3,340,479
LASER TUNABLE BY JUNCTION COUPLING
Arthur Ashkin, Bernardsville, N.J., assignor to Bell Telephone Laboratories, Incorporated, New York, N.Y., a corporation of New York
Filed June 14, 1963, Ser. No. 287,957
2 Claims. (Cl. 331—94.5)

This invention relates to optical maser devices, and more particularly, to optical masers utilizing semiconductor devices characterized by having a junction separating regions of different conductivity type.

The invention of the optical maser, or laser, which generates coherent light waves, has greatly expanded the bandwidth available for communication purposes, for example. In addition, it has made available high intensity coherent light beams which are useful in a wide range of applications. In the present state of the art, the various types of optical masers, such as, for example, gaseous, solid, or semiconductor, produce an output that is, in general, restricted to a single optical frequency or, in some cases, harmonics thereof. Obviously, the limitation to a single output frequency restricts the utility of any particular optical maser device. As has been demonstrated in microwave generation, the property of tunability over a wide range of frequencies greatly enhances the utility of the generator device. In addition, the limitations on output frequency of the various optical maser devices have left gaps in the optical frequency spectrum which have been, up to the present time, left unfilled for want of maser generators at those frequencies. As a consequence, in many applications, it is necessary to design the system to operate with the available frequency rather than operate at what often may be the optimum optical frequency for the particular application.

It is, therefore, an object of the present invention to produce a wide range of optical frequencies from a single optical maser device.

It is another object of this invention to produce a coherent optical frequency output from a single device, the output being continuously variable over a wide range of frequencies.

The present invention is based upon the phenomenon that a p-n junction device of, for example, gallium-arsenide (GaAs) can be made to produce coherent emission at optical frequencies when biased in the forward direction, provided a certain minimum amount of current passes through the junction. Such devices exhibit fluorescence (incoherent radiation) until this minimum amount of current, known as the threshold current, is reached, at which time the device emits coherent radiation. In addition, the current density through the junction determines the frequency of the coherent radiation.

In a copending U.S. patent application of A. Ashkin and M. Gershenzon, Ser. No. 265,511, filed Mar. 15, 1963, now U.S. Patent No. 3,295,911, it is pointed out that one characteristic of a p-n junction device of a material such as GaAs is that the junction itself acts as a dielectric waveguide, trapping the major portion of the light power in the junction itself.

I have found that these characteristics of p-n junctions may be utilized in a manner to be more fully explained hereinafter, to produce a tunable optical maser, which gives a coherent light output over a wide band of frequencies.

In a first illustrative embodiment of the invention, a semiconductor member has first and second regions of p-type material separated by a thin layer of n-type material, thereby forming two p-n junctions parallel to each other. One of the two junctions is forward biased by a suitable source of voltage, and the other of the two junctions is reversed biased by a different voltage source. The layer of n-type material is made sufficiently thin so that electromagnetic energy in one of the junctions, which functions as a dielectric waveguide, is coupled into the other junction, which also functions as a dielectric waveguide. The degree of coupling between the two dielectric waveguides is varied by varying the amount of the reverse bias on the second junction, which in turn varies the width of the depletion layer of the second junction.

Inasmuch as the device itself acts as a resonator for optical frequencies, reflection occurring at the ends of the junctions because of the large impedance discontinuity, the first or forward biased junction cannot break into oscillation, i.e., produce coherent radiation by maser action, until the gain in that junction exceeds the resonator losses. For a set amount of reverse bias on the second junction, sufficient current is applied to the first junction to overcome the losses in the first junction and the loss of energy to the second junction to produce oscillations and coherent radiation, the frequency of which is determined by the current density in the first junction. When the bias on the second junction is changed to produce greater coupling between the two junctions, a larger amount of current is required to produce oscillations by overcoming the losses of the system, and the current density in the first junction is correspondingly increased, with a consequent increase in the radiation frequency. In the present embodiment, the bias source for each of the junctions is made variable so that the coupling between the two junctions can be varied and the amount of current, and current density, in the first or light producing junction can be controlled. With such an arrangement, the device of the embodiment is tunable over a wide range of frequencies.

In a second illustrative embodiment of the invention, a p-n junction device having a single elongated junction has a plurality of contacts arranged adjacent to each other and contacting the p-layer of the device. Each of the contacts is supplied or is connected to a variable voltage or current source. As in the first embodiment of the invention, oscillation and the production of coherent radiation occurs at a particular total current through the junction. In the present embodiment, however, the threshold current remains the same, while the current density is varied by varying the current supplied to each of the contacts, thereby varying the frequency of the optical radiation. Such an arrangement is continuously variable over a wide range of frequencies.

It is a feature of the present invention that a p-n junction device is provided with a plurality of means for varying the current density across the junction and thereby varying the frequency of coherent radiation from the junction.

It is another feature of the present invention, in one embodiment thereof, that a pair of junctions in a semiconductor device are oppositely biased by variable biasing means and are electromagnetically coupled together along their lengths.

It is still another feature of the present invention, in a second embodiment thereof, that a p-n junction device has a plurality of contacts to the p-layer, each of the contacts being connected to a variable voltage or current supply.

These and other features and objects of the present invention will be readily apparent from the following description, taken in conjunction with the accompanying drawings, in which.

Figure 1:
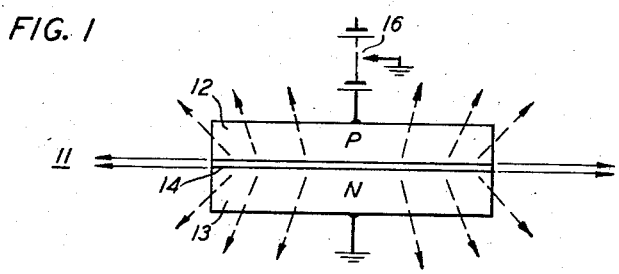
FIG. 1 is a side view of a p-n junction optical maser device.
Figure 2:
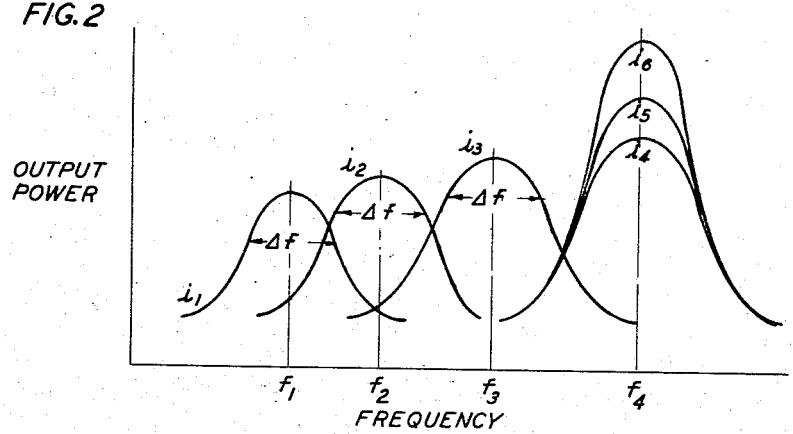
FIG. 2 is a graph of the output frequency and output power of the device of FIG. 1 for different values of energizing current.

Turning now to FIGS. 1 and 2, there is depicted, in FIG. 1, a p-n junction device 11 having a p-region 12 and an n-region 13 separated by a junction 14. A source 16 of variable voltage has its positive terminal connected to the p-region 12 while the n-region 13 is connected to ground. As a consequence, the device 11 is in a forward bias condition. The material of device 11 may be any one of a number of suitable semiconductor materials which exhibit maser properties in the optical range. One such material is GaAs, properly doped, and, for illustrative purposes only, the following discussion deals with this material.

In FIG. 2, there is shown a graph which depicts the behavior of the device 11 when subjected to varying currents supplied by source 16. As can be seen in FIG. 2, when a current $i_1$ is passed through the junction 14, the junction fluoresces at a center optical frequency $f_1$. The fluorescent radiation is incoherent, as depicted by the dotted arrows in FIG. 1. When the current is changed to $i_2$, the center frequency of the fluorescent radiation shifts to frequency $f_2$, and the power output increases. However, the width of the frequency spectrum $\Delta f$, at the half power (3 db) points, remains substantially the same as for the current $i_1$. When the current is increased to $i_3$, the center frequency shifts to $f_3$ and the power output again increases, while the half power frequency spread remains substantially the same.

The device 11 is, essentially, a resonator whether or not reflecting members are placed at the ends thereof. The impedance discontinuity at the ends is sufficient to cause substantial reflection, and hence it is possible to set up standing waves along the junction length. Inasmuch as there are losses in the resonator, the device 11 will not commence to "mase," i.e., emit coherent radiation, until the gain in the resonator is sufficient to overcome the losses. This condition is reached when the current in the junction is great enough. In FIG. 2, this threshold current is depicted as curve $i_4$, and device 11 produces coherent radiation at a frequency $f_4$, as indicated by the solid arrows in FIG. 1. The frequency $f_4$ is not determined by the total current, however, but the current density in the junction. For the arrangement of FIG. 1, current density varies directly as the total current. However, as will be apparent hereinafter, it is possible to vary current density independently of the total current. Once the device 11 commences to generate coherent radiation, further increases in current and current density do not effect the frequency, as depicted by curves $i_5$ and $i_6$ in FIG. 2, although the output power is increased.

Figure 3:
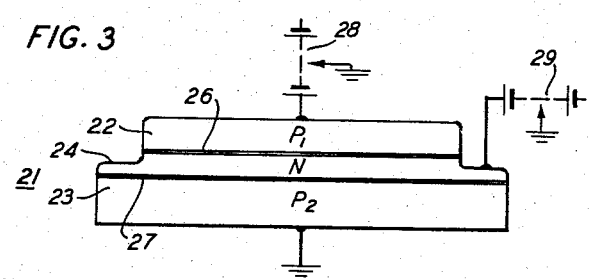
FIG. 3 is a side view of one embodiment of the invention.

In FIG. 3, there is depicted an illustrative embodiment of the present invention wherein the dielectric waveguide phenomenon, as described in the aforementioned Ashkin-Gershenzon application, is utilized to produce an optical maser that is continuously tunable over a wide band of optical frequencies.

The embodiment of FIG. 3 comprises a device 21 having first and second layers 22 and 23 of p-type conductivity material and a layer 24 of n-type material. Layer 24 forms a p-n junction 26 with layer 22 and a p-n junction 27 with layer 23. Junction 26 is forward biased by a variable voltage source 28, while junction 27 is reverse biased by a variable voltage source 29. As pointed out in the aforementioned Ashkin-Gershenzon application, a p-n junction device of appropriate material, such as GaAs, exhibits, under reverse bias, a depletion layer at the junction, the width of which is variable with variations in the reverse bias. It is further pointed out that the p-n junction functions as a dielectric waveguide for the optical energy therein. In the arrangement of FIG. 3, both junctions 26 and 27 can be considered as being dielectric waveguides, and the energy distribution in junction 27 can be controlled by variations in its width produced by variations in voltage from the source 29. Inasmuch as there are two waveguides substantially parallel to each other, it is possible to couple them together. To this end, the n-type layer 24 is made thin enough to allow energy coupling between junctions 26 and 27. This coupling is varied in degree by changes in the width of the depletion layer at junction 27, which produces a change in energy distribution in that layer. Thus, when increased reverse bias is applied across junction 27, the depletion layer is widened, with the consequence that the energy field external to the depletion layer (an external field being a characteristic of dielectric waveguides), is reduced with a consequent reduction in coupling between junctions 26 and 27. Conversely, when the depletion layer of junction 27 is narrowed by application of a less reverse bias, or even a slightly positive bias, the external field along junction 27 is increased, with a consequent increase in coupling between junctions 26 and 27.

In operation, with the reverse bias on junction 27 set at a fixed value, the positive bias on junction 26 is gradually increased. Because junctions 26 and 27 are coupled together, it is necessary, in order to produce a coherent light output from junction 26, to supply sufficient current to junction 26 to overcome not only the losses in that junction, but the losses in the system resulting from the energy coupling between junctions 26 and 27. At some value of total current, junction 26 commences to "mase" at a frequency determined by the current density therein. It can readily be seen that the amount of current required for coherent radiation depends upon the degree of coupling between junctions 26 and 27 and, hence, the total losses of the system. On the other hand, the current density and hence the frequency of the output increases as the current from source 28 increases. Thus, the frequency of the light output from jnction 26 can be varied by varying the bias on junction 27. As the depletion layer is made increasingly narrow, the coupling between the junctions becomes increasingly greater and the losses of the system become increasingly greater, hence, the current required to produce maser operation becomes increasingly greater. The increasing current produces increasing current density and, consequently, increasing frequency at which the device "mases." Conversely, as the depletion layer is made increasingly wider by application of an increasingly greater reverse bias from source 29, the coupling between junctions 26 and 27 decreases, the losses of the system decrease, the current necessary for maser action decreases, the current density in junction 26 decreases, and, as a consequence, the frequency of the maser output decreases.

It is readily apparent from the foregoing that the device 21 functions as a tunable optical maser, the frequency tuning being accomplished through varying the voltage source 29 and the maser output being produced through varying the voltage from source 28.

Figure 4:
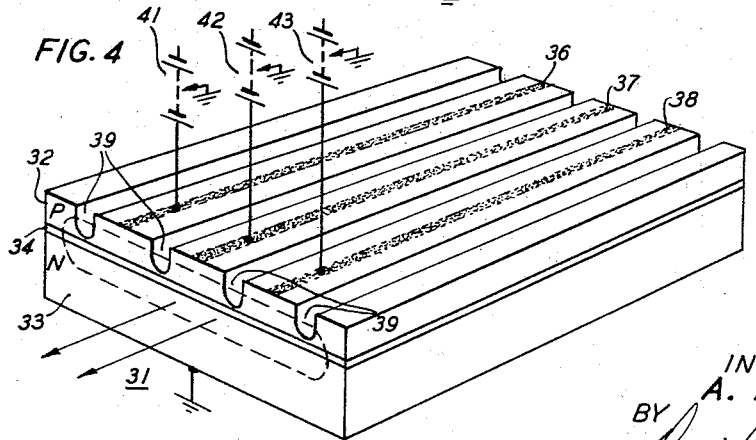
FIG. 4 is a perspective view of another embodiment of the present invention.

In FIG. 4, there is depicted a second embodiment of the present invention which utilizes a single p-n junction to produce tunable optical maser action over a wide band of frequencies.

The embodiment of FIG. 4 comprises a semiconductor device 31 having a layer 32 of p-type material and a layer 33 of n-type material with a junction 34 between layers 32 and 33. Disposed along the upper surface of layer 32 are a plurality of conductive strips 36, 37, and 38 forming conductive contacts with layer 32. A plurality of longitudinally extending notches 39 extend parallel to the strips 36, 37, and 38 so that each strip has on either side thereof a pair of notches 39. Connected to each of the conductive strips 36, 37, and 38 is a variable voltage source 41, 42, and 43, respectively, connected in the forward bias direction.

In operation, if only source 41 is supplying voltage to the device 31, device 31 commences to "mase" when the threshold current is reached, as explained heretofore, and coherent optical radiation is emitted from the junction 34, as indicated by the solid arrows. Notches 39 perform the function of confining substantially all of the current to the region immediately below the contact strip 36, inasmuch as the lateral resistance to current flow is greater, because of notches 39, than the resistance from the p-layer 32 to the n-layer 33. The frequency of the radiation is determined by the current density through the junction 34.

When sources 41 and 42 supply the current, so that the sum of the currents equals the threshold current, the junction 34 emits coherent light, but the frequency of the emitted radiation is reduced inasmuch as the current density is reduced by a factor of two from that which existed when only source 41 supplied the current. When sources 41, 42, and 43 supply the current, the current density is reduced by a factor of three, with a consequent reduction in frequency. In like manner, additional sources and conducting strips will produce further changes in frequency. Device 31 preferably forms a resonator oscillating in a single mode, the limits of which are indicated by the dotted lines in FIG. 4. For proper operation, it is desirable that all of the current or voltage sources feed this mode.

From the foregoing, it can be seen that the principles of the present invention produce tunable optical maser action. The embodiments shown are by way of illustration, and other arrangements utilizing the invention principles are possible. For example, it is possible to make the arrangement of FIG. 1 oscillate and radiate at a desired frequency by coating the surface of the p-layer with material that is light attenuating, thereby introducing loss into the resonator system and requiring different threshold currents and thus different current densities. It is also possible to utilize a light attenuating glass that is movable relative to the junction to vary the amount of loss in the resonator system.

In the embodiment shown, the various voltage sources have been depicted schematically as batteries. It is to be understood that this is a schematic representation only, and that the sources may take any one of a number of forms, depending upon the particular application.

While various embodiments of the principles of the invention have been shown or suggested, other embodiments may readily occur to workers in the art without departing from the spirit and scope of the invention.

What is claimed is:
1. A tunable optical maser device comprising a semiconductor member having regions of p-type conductivity and n-type conductivity materials forming first and second substantially parallel and coextensive p-n junctions, said first junction being characterized by a threshold of oscillation dependent upon the current flow therethrough and a frequency of oscillation dependent upon the current density thereon, the said second junction being characterized by a depletion layer of sufficient width to produce electromagnetic coupling with said first junction, the region between said first and second junctions being of sufficient width to permit electromagnetic coupling between the two junctions, means for producing a current flow through said first junction, and means for controlling the amount of current through said first junction necessary to produce oscillations comprising means for varying the width of the depletion layer of said second junction to vary the degree of coupling between the two junctions.

2. An optical maser as claimed in claim 1 wherein said means for varying the width of the depletion layer of said second junction to vary the degree of coupling comprises means for reverse biasing the said second junction.

References Cited
UNITED STATES PATENTS
3,158,746 11/1954 Lehovec _____ 88—61 X
3,245,002 4/1966 Hall _____ 331—94.5

OTHER REFERENCES
Nathan: "GaAs Injection Laser," Quantum Electronics, Paris 1963 Conference, February 1963, pp. 1863–1872.

Pankove: "Tunneling-Assisted Photon Emission in Gallium Arsenide pn Junctions," Physical Review Letters, vol. 9, No. 7, October 1962, pp. 283–285.

Wang: "Direct Radiative Recombination in Ge Mesa Transistors," Applied Physics Letters, vol. 2, No. 8, Apr. 15, 1962, pp. 149–150.

JEWELL H. PEDERSEN, *Primary Examiner.*
E. S. BAUER, *Assistant Examiner.*